(12) United States Patent
Huang

(10) Patent No.: US 8,319,915 B2
(45) Date of Patent: Nov. 27, 2012

(54) LIQUID CRYSTAL ON SILICON IMAGER

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 263 days.

(21) Appl. No.: 12/849,216

(22) Filed: Aug. 3, 2010

(65) Prior Publication Data

US 2011/0025957 A1  Feb. 3, 2011

Related U.S. Application Data

(60) Provisional application No. 61/230,961, filed on Aug. 3, 2009.

(51) Int. Cl.
*G02F 1/1343* (2006.01)
*G02F 1/1335* (2006.01)

(52) U.S. Cl. ............ 349/97; 349/96; 349/113; 349/144; 349/162

(58) Field of Classification Search ........................ None
See application file for complete search history.

(56) References Cited

U.S. PATENT DOCUMENTS

| | | | |
|---|---|---|---|
| 4,688,897 A * | 8/1987 | Grinberg et al. | 349/162 |
| 6,181,397 B1 * | 1/2001 | Ichimura | 349/113 |
| 6,243,199 B1 | 6/2001 | Hansen et al. | 359/486 |
| 8,120,727 B2 * | 2/2012 | Wang et al. | 349/96 |
| 2003/0210369 A1 * | 11/2003 | Wu | 349/114 |
| 2006/0061519 A1 * | 3/2006 | Fisher et al. | 345/32 |
| 2007/0242195 A1 * | 10/2007 | Kuan et al. | 349/113 |
| 2011/0141422 A1 * | 6/2011 | Yanagawa | 349/139 |

* cited by examiner

*Primary Examiner* — Mike Stahl
(74) *Attorney, Agent, or Firm* — J.C. Patents

(57) ABSTRACT

The present invention relates to a liquid crystal on silicon imager. The imager includes a backplane substrate, a reflective polarization electrode array, a planar liquid crystal cell, a transparent conductive film and a transparent plate. The reflective polarization electrode array is placed onto the backplane substrate, consists of a plurality of reflective polarization electrodes, and a pattern of each of the reflective polarization electrodes is configured in a planar arrangement having regularly spaced and electrically isolated gaps in parallel to each other. The planar liquid crystal cell is placed above the reflective polarization electrode array. The transparent conductive film is placed above the planar liquid crystal cell. The transparent plate is placed on the transparent conductive film and facing incident light. Through embedding the reflective polarization electrodes, only one polarization portion could be reflected back, while the residual polarization portion is let pass but not reflected back as desired, thereby decreasing the loss in contrast ratio of the imager.

18 Claims, 1 Drawing Sheet

LIQUID CRYSTAL ON SILICON IMAGER

CROSS-REFERENCE TO RELATED APPLICATIONS

This application claims priority to U.S. Provisional Patent Application No. 61/230,961, filed on Aug. 3, 2009, entitled "LIQUID CRYSTAL ON SILICON IMAGER WITH EMBEDDED REFLECTIVE POLARIZERS", which is hereby incorporated by reference in its entirety.

FIELD OF THE TECHNOLOGY

The present invention generally relates to technologies of spatial modulation display panel, and more particularly, to a liquid crystal on silicon imager with embedded reflective polarizers.

BACKGROUND

In recent years, reflective liquid crystal on silicon (LCOS) imagers are widely employed for projection displays of various sizes, from professional projection for theaters and home entertainment to portable micro to pico projection in hand-held electronics devices.

The basic planar components of a LCOS imager include a top cover, planar liquid crystal cell and an active matrix backplane. The top cover glass is generally provided with a transparent conductive film, which is most commonly made from transparent conductive material, such as indium tin oxide (ITO). The active matrix backplane takes a silicon substrate as a backplane substrate, and a reflective pixilated-electrode array is formed on the backplane substrate. The planar liquid crystal cell is sandwiched between the transparent conductive film and the reflective pixilated-electrode array. Spatial modulation by such a LCOS imager takes effect on particular polarized illumination oriented relative to the liquid crystal cell, for example, on the light portion of P-polarization, while little on the counterpart of S-polarization orthogonal to the P-polarized light potion. Though in general illumination to a LCOS imager is pre-polarized, still illumination contains residual light portion of S-polarization being reflected back without modulation, which might lead to loss in contrast ratio when the LCOS image is used for projection display.

SUMMARY

The object of the present invention is to provide a liquid crystal on silicon imager, so as to avoid illumination light without spatial modulation from reflecting back, and thereby decreasing the loss in contrast ratio of the imager.

Embodiments of the present invention provide a liquid crystal on silicon imager, and the imager comprises:

a backplane substrate;

a reflective polarization electrode array, placed onto the backplane substrate, wherein the reflective polarization electrode array consists of a plurality of reflective polarization electrodes, and a pattern of each of the reflective polarization electrodes is configured in a planar arrangement having regularly spaced and electrically isolated gaps in parallel to each other;

a planar liquid crystal cell, placed above the reflective polarization electrode array;

a transparent conductive film, placed above the planar liquid crystal cell; and a transparent plate, placed on the transparent conductive film and facing incident light.

In the liquid crystal on silicon imager provided by the present invention, through embedding the reflective polarization electrodes, only one polarization portion could be reflected back, while the residual polarization portion is let pass but not reflected back as desired, thereby decreasing the loss in contrast ratio of the imager.

BRIEF DESCRIPTION OF THE DRAWINGS

The disclosure may be more completely understood in consideration of the following detailed description of various embodiments in connection with the accompanying drawings, in which.

DETAILED DESCRIPTION

The objectives, other features and advantages of the invention will become more apparent and easily understood from the following detailed description of the invention when taken in conjunction with the accompanying drawings.

The drawings for illustration are not necessarily to scale, emphasis instead being placed upon illustrating the framework and principles of the present invention. In the following description, reference is made to the accompanying drawings which form a part hereof, and which show, by way of illustration, a preferred embodiment of the present invention. It is understood that other embodiments may be utilized and structural changes may be made without departing from the scope of the present invention.

Figure 1:
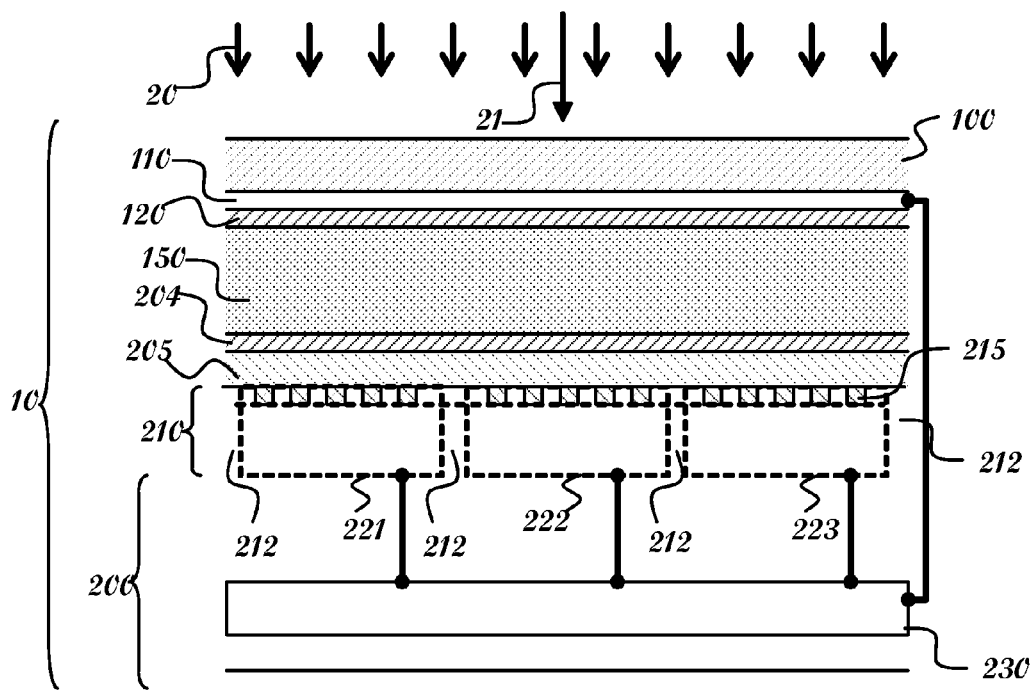
FIG. 1 is a cross sectional view of the liquid crystal on silicon imager according to an embodiment of the present invention.

FIG. 1 is a cross sectional view of the liquid crystal on silicon imager according to an embodiment of the present invention. The liquid crystal on silicon imager 10 is a spatial modulation display. The liquid crystal on silicon imager 10 is in a stacked layer configuration, and in the reverse order of receiving incident light 20 along the incident direction 21, the imager 10 includes a backplane substrate 200; a reflective polarization electrode array 210, a planar liquid crystal cell 150, a transparent conductive film 110 and a transparent plate 100. The reflective polarization electrode array 210 is placed onto the backplane substrate 200, and the reflective polarization electrode array 210 consists of a plurality of reflective polarization electrodes 211. A pattern of each of the reflective polarization electrodes 211 is configured in a planar arrangement, which has regularly spaced and electrically isolated gaps in parallel to each other. The planar liquid crystal cell 150 is placed above the reflective polarization electrode array 210. The transparent conductive film 110 is placed above the planar liquid crystal cell 150. The transparent plate 100 is placed on the transparent conductive film 110 and facing the incident light 20.

In the above liquid crystal on silicon imager 10, the backplane substrate 200 may be made from semiconductors including any one or combination of silicon, germanium, gallium and arsenic, or the backplane substrate 200 may be made from any one or combination of solid state dielectric materials including glass, polymers and so on. The transparent conductive film 110 may be made of transparent conductive material, such as indium tin oxide (ITO). The planar liquid crystal cell 150 is sandwiched between the transparent conductive film 110 and the reflective polarization electrode array 210, so as to provide spatial modulation on the incident light 20. Each reflective polarization electrodes 211 are relative to pixel respectively, and they can reflect back the light with spatial modulation, thereby displaying images.

In addition to the above basic components, as shown in FIG. 1, the liquid crystal on silicon imager 10 of the present embodiment further may include other components. The reflective polarization electrode array 210 may be further coated with a first alignment layer 204, the transparent conductive film 110 may be further coated with a second alignment layer 120, and the planar liquid crystal cell 150 can be sandwiched between the first alignment layer 204 and the second alignment layer 120. The first alignment layer 204 and the second alignment layer 120 may be made of any one or combination of polyimide, oxides, nitrides and carbon.

The liquid crystal on silicon imager 10 may further include a driving circuitry 230, which is connected to the reflective polarization electrodes 211 respectively, and provides electrical charge onto and discharge from the reflective polarization electrodes 211, individually and independently. As shown in FIG. 1, the driving circuitry 230 may be placed on the backplane substrate 200.

The reflective polarization electrode array 210 may be further deposited with a transparent protective dielectric coating 205 and the planar liquid crystal cell 150 is placed on the transparent protective dielectric coating 205. The transparent protective dielectric coating 205 may be made from any one or combination of polyimide, silicon oxide, silicon nitride and carbon.

In order to drive the reflective polarization electrodes 211 corresponding to pixel independently and respectively, the reflective polarization electrodes 211 need to be isolated from each other. The reflective polarization electrode array 210 further includes a plurality of pixel isolators 212, and the pixel isolators 212 are placed between the reflective polarization electrodes 211 to electrically isolate the reflective polarization electrodes 211 each to other. Preferably, the transparent protective dielectric coating 205 may be formed into gaps between each reflective polarization electrodes 211 to take effect as the isolators, and the reflective polarization electrodes 211 are electrically isolated each to other by the transparent protective dielectric coating 205.

The liquid crystal on silicon imager 10 is a LCOS imager panel in display. The reflective polarization electrodes 211 on top of the active matrix backplane on a silicon substrate are the pixilated reflective electrodes. The most distinguishing feature of embodiments of the present invention is to employ an embedded polarizer onto each of pixilated reflective electrodes, so as to form the reflective polarization electrodes 211. The pixilated reflective polarization electrodes 211 on top of the active matrix backplane on a silicon substrate are configured to reflect only illumination of one polarization while let pass or absorb the other.

The reflective polarization electrodes 211 having the above function could be accomplished by designing the pattern of each of the reflective polarization electrodes 211. In the present embodiment, the pattern of each of reflective polarization electrodes 211 is a planar arrangement having regularly spaced and electrically isolated gaps in parallel to each other. The planar arrangement having the above structure characteristic is perpendicular to the incident light 20. Only the polarization portion of illumination with electric field parallel to the regular gaps are partially absorbed but mostly reflected back, while the residual polarization portion of illumination with electric field perpendicular to the regular gaps is let pass the reflective polarization electrodes 211 but not reflected back as desired. The electric field of the polarization light could be meet by designing the pattern of the planar arrangement of the reflective polarization electrodes 211, thereby only reflecting back the desire portion of light, so the loss in contrast ratio of the imager could be decreased.

Figure 2:
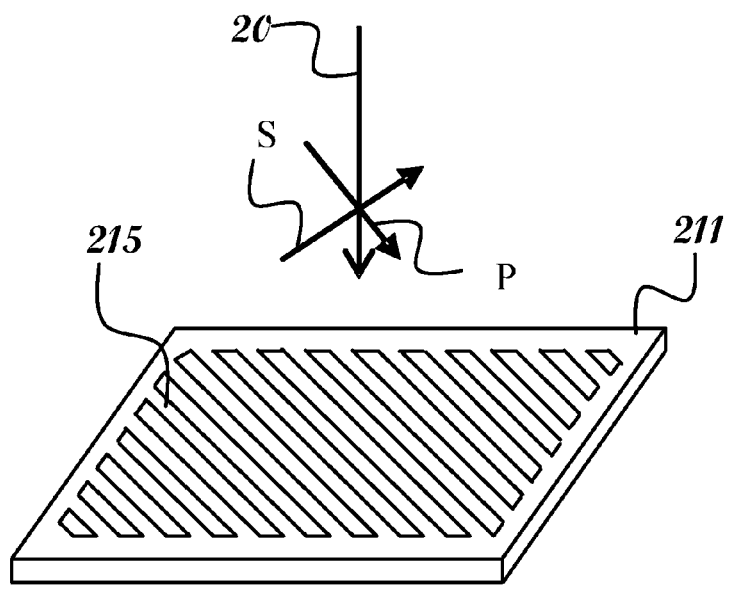
FIG. 2 is a schematic view of one reflective polarization electrode in the liquid crystal on silicon imager according to an embodiment of the present invention.

The reflective polarization electrodes 211 in parallel to each other, and configured in a regularly spaced and electrically isolated planar arrangement can be preferably accomplished as shown in FIG. 2. Each of the reflective polarization electrodes 211 includes a plurality of ultra fine parallel elongated conductive elements 215 electrically connected each other and configured in parallel to the planar liquid crystal cell 150. As shown in FIG. 2, the pattern of each of the reflective polarization electrodes 211 has regular conductive elements 215, thereby forming regular gaps between the conductive elements 215 and the regular gaps are in parallel to each other. The conductive elements 215 are electrically connected each other on the edges of the reflective polarization electrode 211. The elongated conductive elements 215 may be made of any or combination of reflective metals and their alloys including aluminum, titanium, copper, platinum, silver and gold, which are commonly available in semiconductor thin film fabrication. The ends of elongated conductive elements 215 are electrically connected together to the driving circuitry 230 and configured in parallel to the planar liquid crystal cell 150, as a miniaturized wire grid polarizer. Only the polarization portion of illumination with electric field parallel to the elongated conductive elements 215 are partially absorbed but mostly reflected, while the residual polarization portion of illumination with electric field perpendicular to the elongated conductive elements 215 is let pass but not reflected back as desired. As shown in FIG. 2, since P polarization portion of illumination has electric field in parallel to the conductive elements 215, P polarization portion can be reflected back. Since S polarization portion of illumination has electric field perpendicular to the conductive elements 215, S polarization portion can pass the reflective polarization electrode 211 and can not be reflected back. Therefore, the pixilated reflective polarization electrodes 211 provide in situ reflective polarization filtering to the incident illumination 20, after passing the transparent plate 100, the transparent conductive film 110 and the planar liquid crystal cell 150 with 45-degree polarization rotation, in addition to the designed reflection and electric charging function fundamental to the LCOS microdisplay imager.

And in general, the lateral dimensions in pitch and width of the parallel elongated conductive elements 215 may be configured proportional to the quarter of a selective wavelength of visible light, with the pitch ranging from 100 to 200 nm and the width from 50 to 100 nanometers as disclosed in the prior art of metal wire grid polarizers.

The above reflective polarization electrodes 211 may be spatially regrouped into several groups, preferably divided into three groups, which have different micro structural patterns, for example, pitches and widths. By designing the planar arrangement pattern of the reflective polarization electrodes 211, a first group of reflective polarization electrodes 221 can be configured to have a first polarization reflection spectrum, a second group of reflective polarization electrodes 222 can be configured to have a second polarization reflection spectrum and a third group of reflective polarization electrodes 223 can be configured to have a third polarization reflection spectrum. Such different structural patterns are purposely configured for reflecting only illumination portion of selected bands but to block the one of the others in visible spectrum. As widely used in many display or imaging systems, the first polarization reflection spectrum, the second polarization reflection spectrum and the third polarization reflection spectrum, to incident illumination 20, may be tuned for substantially matching either the band pass spectra of blue, green and red, respectively; or the first polarization reflection spectrum, the second polarization reflection spectrum and the third polarization reflection spectrum may be tuned for substantially matching either the band block spectra of yellow, magenta and cyan, respectively. Preferably, the first group of reflective polarization electrodes 221, the second group of reflective polarization electrodes 222 and the third group of reflective polarization electrodes 223 are spatially configured individually in a regularly interwoven planar pattern, that is, each group of reflective polarization electrodes 211 are distributed uniformity and spaced from each other, so a colored polarization reflective modulation is produced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal on silicon imager, comprising:
    a backplane substrate;
    a reflective polarization electrode array, placed onto the backplane substrate, wherein the reflective polarization electrode array consists of a plurality of reflective polarization electrodes, and a pattern of each of the reflective polarization electrodes is configured in a planar arrangement having regularly spaced and electrically isolated gaps in parallel to each other;
    a planar liquid crystal cell, placed above the reflective polarization electrode array;
    a transparent conductive film, placed above the planar liquid crystal cell; and
    a transparent plate, placed on the transparent conductive film and facing incident light;
    wherein the reflective polarization electrodes are spatially regrouped into several groups, which have different micro structural patterns.

2. The liquid crystal on silicon imager according to claim 1, wherein the reflective polarization electrode array is coated with a first alignment layer, the transparent conductive film is coated with a second alignment layer, and the planar liquid crystal cell is sandwiched between the first alignment layer and the second alignment layer.

3. The liquid crystal on silicon imager according to claim 1, wherein the reflective polarization electrode array is deposited with a transparent protective dielectric coating and the planar liquid crystal cell is placed on the transparent protective dielectric coating.

4. The liquid crystal on silicon imager according to claim 3, wherein the transparent protective dielectric coating is formed into gaps between the reflective polarization electrodes, and the reflective polarization electrodes are electrically isolated from each other by the transparent protective dielectric coating.

5. The liquid crystal on silicon imager according to claim 1, wherein the liquid crystal on silicon imager further includes a driving circuitry connected to the reflective polarization electrodes respectively, and providing electrical charge onto and discharge from the reflective polarization electrodes, individually and independently.

6. The liquid crystal on silicon imager according to claim 1, wherein the reflective polarization electrode array further includes a plurality of pixel isolators, and the pixel isolators are placed between the reflective polarization electrodes to electrically isolate the reflective polarization electrodes each to other.

7. The liquid crystal on silicon imager according to claim 1, wherein the transparent conductive film is made of indium tin oxide.

8. The liquid crystal on silicon imager according to claim 1, wherein the backplane substrate is made from semiconductors including any one or combination of silicon, germanium, gallium and arsenic.

9. The liquid crystal on silicon imager according to claim 1, wherein the backplane substrate is made from glass, polymers or combination thereof.

10. The liquid crystal on silicon imager according to claim 2, wherein the first alignment layer and the second alignment layer are made of any one or combination of polyimide, oxides, nitrides and carbon.

11. The liquid crystal on silicon imager according to claim 3, wherein the transparent protective dielectric coating is made from any one or combination of polyimide, silicon oxide, silicon nitride and carbon.

12. The liquid crystal on silicon imager according to claim 1, wherein each of the reflective polarization electrodes comprises a plurality of parallel elongated conductive elements electrically connected each other and configured in parallel to the planar liquid crystal cell.

13. The liquid crystal on silicon imager according to claim 12, wherein the elongated conductive elements are made of any or combination of reflective metals and their alloys including aluminum, titanium, copper, platinum, silver and gold.

14. The liquid crystal on silicon imager according to claim 1, wherein the reflective polarization electrodes are divided into three groups, a first group of reflective polarization electrodes is configured to have a first polarization reflection spectrum, a second group of reflective polarization electrodes is configured to have a second polarization reflection spectrum and a third group of reflective polarization electrodes is configured to have a third polarization reflection spectrum, and the first, second and third groups of reflective polarization electrodes have different polarization reflection spectrum from each other.

15. The liquid crystal on silicon imager according to claim 14, wherein the first polarization reflection spectrum, the second polarization reflection spectrum and the third polarization reflection spectrum are corresponding to band pass spectra of blue, green and red, respectively; or the first polarization reflection spectrum, the second polarization reflection spectrum and the third polarization reflection spectrum are corresponding to band block spectra of yellow, magenta and cyan, respectively.

16. The liquid crystal on silicon imager according to claim 14, wherein the first group of reflective polarization electrodes, the second group of reflective polarization electrodes and the third group of reflective polarization electrodes are spatially configured individually in a regularly interwoven planar pattern.

17. The liquid crystal on silicon imager according to claim 15, wherein the first group of reflective polarization electrodes, the second group of reflective polarization electrodes and the third group of reflective polarization electrodes are spatially configured individually in a regularly interwoven planar pattern.

18. The liquid crystal on silicon imager according to claim 1, wherein the several groups of reflective polarization electrodes have different polarization reflection spectrum.

\* \* \* \* \*